L. WOLFFGRAM.
COUPLING.
APPLICATION FILED DEC. 12, 1916.

1,300,541.

Patented Apr. 15, 1919.

INVENTOR
Ludwig Wolffgram

ATTORNEY

UNITED STATES PATENT OFFICE.

LUDWIG WOLFFGRAM, OF ERIE, PENNSYLVANIA.

COUPLING.

1,300,541.

Specification of Letters Patent.   Patented Apr. 15, 1919.

Application filed December 12, 1916.   Serial No. 136,400.

*To all whom it may concern:*

Be it known that I, LUDWIG WOLFFGRAM, a citizen of the German Empire, and a resident of Erie, in the State of Pennsylvania, have invented certain new and useful Improvements in Couplings, of which the following is a specification.

The present invention relates to improvements in couplings, and particularly couplings of the universal type intended for use with drive shafts and the like, the invention being particularly intended for shafts which are not shiftable along their longitudinal axis.

An object of the invention is to provide such a coupling which will permit of the transmission of power from one shaft to the next in a positive manner, without loss of motion, and which at the same time will permit the shafts to be inclined to each other at an angle of 15° more or less, and in which the inclination is either constant or changeable. A further object is to provide such a coupling which may be readily assembled, and in which the possibility of breakage, and the necessity for repair is reduced to a negligible quantity, the simplicity of the invention permitting of its being manufactured economically, and the standardization of its parts permitting their ready renewal.

With these and other objects in view, an embodiment of my invention is shown in the accompanying drawings, and this embodiment will be hereinafter more fully described with reference thereto, and the invention will be finally pointed out in the claims.

In the drawings.

Similar reference characters indicate corresponding parts throughout the several figures of the drawings.

Figure 1:
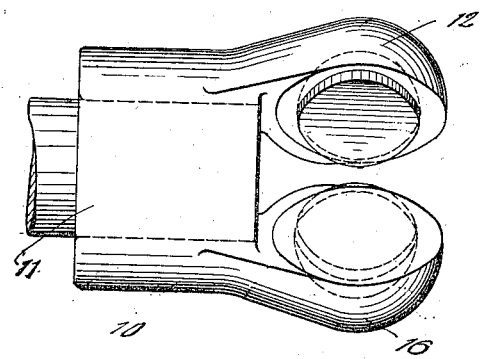
Figure 1 shows one member.
Figure 2:
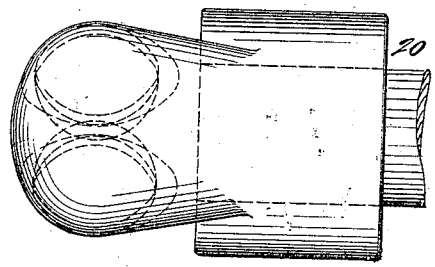
Fig. 2 shows the other member which is similar thereto, but turned at an angle of 90° therefrom.
Figure 3:
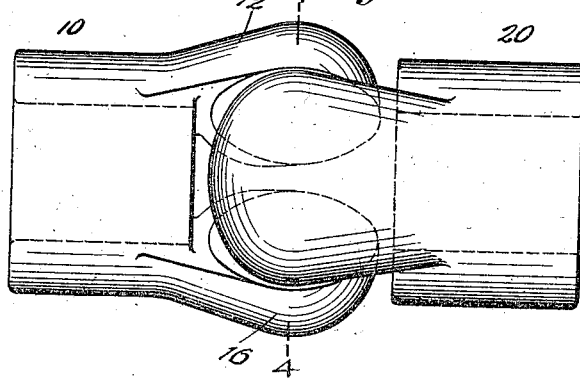
Fig. 3 shows the members assembled.
Figure 4:
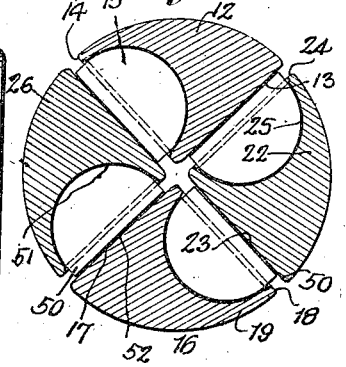
Fig. 4 is a sectional view on the line 4—4 of Fig. 3.

This embodiment comprises two similar complementary members 10 and 20 adapted for application respectively to the adjacent ends of two shaft sections or shafts 30 and 40.

The member 10 has a socket 11 adapted to fit over the end of a shaft. This member is provided with wedge-shaped rigid jaws 12 and 16 projecting from one end of said socket, preferably of enlarged sectoral form and preferably disposed diametrically opposite each other. These jaws of the same member are spaced from the axis thereof and from each other at their apexes. The jaw 12 has a radial face 13 which is plane or flat and a radial face 14 which is provided with a socket 15 of spherical curvature, said socket occupying approximately the whole area of said radial face. The jaw 16 has a radial face 17 which is plane or flat and a radial face 18 provided with a socket 19 of spherical curvature, said socket occupying approximately the whole area of said radial face.

The member 20 has a socket 21 adapted to fit over or engage a shaft. This member is also provided with wedge-shaped rigid jaws 22 and 26 projecting from one end of said socket preferably of enlarged sectoral form and preferably disposed diametrically opposite each other. These jaws of this member are likewise spaced from its axis and from each other at their apexes.

The jaw 22 has a radial face 23 which is plane or flat and a radial face 24 which is provided with a socket 25 of spherical curvature, said socket occupying approximately the whole area of said radial face.

A plurality of similar segmental bearing blocks as 50 are interposed between the jaws of the different members. Each bearing block has a spherical surface 51 adapted to fit one of the sockets of one of the jaws of one of the members of the coupling and a plane surface 52 adapted to rest on the plane face of the adjacent jaw of another member, the radial depth of the block being equal to the depth of the socket plus the space between the adjacent members.

Figure 5:
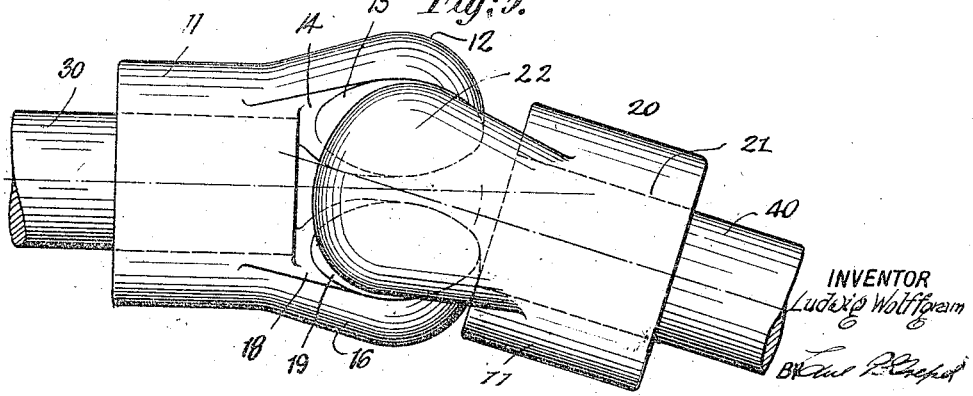
Fig. 5 shows the shafts inclined to each other.

This construction, it will be seen, provides a positive non-yieldable connection between the two shafts, which enables a transmission of power without any loss of motion, and without rattling or noise, and which maintains these characteristics when the shafts are moved at an inclination to each other, as shown in Fig. 5. When so moved, the block members turn in their sockets, and slide along the plane surfaces of the opposed wedge portions. To disconnect the couplings, it is only necessary to move one shaft away from the other, drawing the wedge shaped portions of one coupling from between the wedge shaped portions of the other coupling. The block members may be readily renewed when desired.

I have illustrated a preferred and satisfactory embodiment of my invention, but it is obvious that changes may be made therein within the spirit and scope thereof, as defined in the appended claims.

I claim:

1. A flexible shaft coupling comprising a plurality of similar complementary members each having two enlarged oppositely disposed rigid wedge-shaped jaws spaced apart at their apexes, one radial face of each jaw having a socket of spherical curvature and the other radial face being flat, and segmental bearing blocks severally provided with spherical surfaces and plane surfaces, each block engaging a socket of one jaw of one wedge-shaped member and a plane radial surface of the adjacent jaw of another wedge-shaped member.

2. A flexible shaft coupling comprising a plurality of similar complementary members each consisting of a tubular shank adapted to engage a shaft and a plurality of enlarged oppositely disposed rigid wedge-shaped jaws projecting from one end of said shank and spaced apart at the axis thereof, one radial face of each jaw having a socket of spherical curvature and the other radial face being flat, and segmental bearing blocks severally provided with spherical surfaces and plane surfaces, each block engaging a socket of one jaw of one wedge-shaped member and a plane radial surface of the adjacent jaw of another wedge-shaped member.

In testimony that I claim the foregoing as my invention, I have signed my name in presence of two subscribing witnesses.

LUDWIG WOLFFGRAM.

Witnesses:
ROBERT N. CHINNOCK,
JOHN B. EICHENLAUB.